Patented Nov. 20, 1951

2,576,083

UNITED STATES PATENT OFFICE 2,576,083

PLANT GROWTH REGULATION

Nathaniel Tischler, Palmyra, N. J., assignor to Sharples Chemicals Inc., a corporation of Delaware No Drawing. Application May 10, 1950,
Serial No. 161,255

19 Claims. (Cl. 71—2.4)

This invention relates to new and improved compositions of matter which are used for treating growing plants to alter the normal life cycle of said plants with advantageous results. It is particularly concerned with phytotoxic compositions which contain at least one of the 3,6-endoxohydro-orthophthalic acids as active ingredient, that is, as plant response agent.

It is an object of the invention to provide phytotoxic compositions containing at least one of the aforesaid acids, particularly 3,6-endoxo-1,2,3,6-tetrahydro-orthophthalic acid and/or 3,6-endoxohexahydro-orthophthalic acid, and more particularly such acids in the exo-cis isomeric form. It is also an object to provide compositions so formulated that the active ingredient contained therein is able to cause a high degree of desirable phytotoxic action. It is a further object to provide compositions containing the active ingredient in admixture with simple, readily available, low-cost materials which enhance, or intensify the plant response activity of the active ingredient. These and other objects will become apparent to persons skilled in the art as the specification proceeds.

Co-pending application Serial No. 81,026, filed March 11, 1949, by Nathaniel Tischler and Ernest P. Bell, teaches the efficacy of the 3,6-endoxohydro-orthophthalic acids and their derivatives in bringing about useful plant response effects such as leaf abscission (partial or complete), blossom thinning, vine-kill, total destruction of the plant, adventitious root formation, or delay of fruit drop, the particular plant response manifested depending to a large extent upon the applied concentration of the response agent, and the species and degree of maturity of the plant undergoing treatment.

The use of 3,6-endoxohexahydro-orthophthalic acid for the above purposes is particularly described and claimed in the co-pending application of Ernest P. Bell and Nathaniel Tischler, Serial No. 131,501, filed December 6, 1949; and the use of 3,6-endoxo-1,2,3,6-tetrahydro-orthophthalic acid for such purposes is particularly described and claimed in the co-pending application of the same inventors, Serial No. 131,502, filed December 6, 1949. Both of these applications are continuations-in-part of said first-mentioned application.

The above-mentioned compounds as applied to plants may be in the form of the acid per se or in other form, such as in the form of the anhydride and/or a salt which contains the corresponding anion or anions of ortho configuration, the same as in the case of the acid per se, said anion or anions being either acid or neutral in character, in chemical combination with a sufficiency of cation or cations to satisfy valence requirements, such as one or more metal and/or metalloid cations such as sodium, potassium, calcium, strontium, magnesium, aluminum, iron, cobalt, nickel, zinc, cadmium, mercury, copper, ammonium, mono-, di- and trialkylammonium, mono-, di- and trialkanolammonium, and mixed alkylalkanolammonium which is N-substituted by from 2 to 3 radicals of the type indicated.

Thus the acid is the active material, and this is true whether it is used as such, or in the form of a salt, or anhydride, or other form. These changes at the carboxyl groups are mere changes in form rather than changes in substance.

Turning now to the present invention, which for convenience will be described more particularly with reference to 3,6-endoxohexahydro-orthophthalic acid and 3,6-endoxo-1,2,3,6-tetrahydro-orthophthalic acid (per se or in equivalent form) as active plant response ingredients of my new compositions, it is pointed out that said acids are appreciably soluble in water. The other forms are also water-soluble. Some of them are highly soluble, while others have a lesser degree of solubility. However, it is preferred to employ compounds having a solubility in water to the extent of at least 0.1% by weight, and still more particularly of at least 1% by weight.

Water solubility is desirable so that anions (acid or neutral or both) are formed when the acids, per se or in chemically equivalent form, are dissolved in water. The desirability of such anions will presently become apparent.

Acid anions may be theoretically illustrated by reference to the acid 3,6-endoxohexahydro-orthophthalate anion, by which is meant a univalent anion having a structure defined by the formula

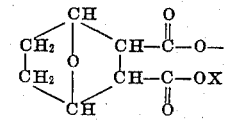

wherein X is a cation, usually considered by modern theory to be hydrogen.

Neutral anions may be theoretically illustrated by reference to the neutral 3,6-endoxohexahydro-orthophthalate anion, by which is meant a divalent anion having a structure defined by the formula

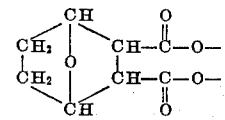

Theoretically, similar anions are formed when the tetrahydro acid or its chemically equivalent forms are dissolved in water.

Although the present applicant does not wish to be bound by any particular theory as to the mechanism whereby useful plant response effects are produced, a considerable amount of experimentation strongly indicates that said effects are brought about by the existence in aqueous media of anion or anions (acid and/or neutral) of the type illustrated above. Both neutral anion and acid anion are effective. A salient feature of this theory is that the acid or acids of the invention, when applied per se, or in other form, to a living plant, makes the desired anion or anions (acid and/or neutral) available to the plant, at or near the site of application, and through translocation phenomena, at points far removed from the site of application.

The desired anion or anions are made available by virtue of the fact that the acids per se, and their other forms, are water-soluble and ionizable. Therefore, when such a compound is absorbed into the vascular system of a plant, it dissolves in the aqueous plant juices and provides the functioning anion or anions. The resulting physiological activity is believed to be ascribable to the presence of said anion or anions. The acids per se and their other forms may thus be regarded as very convenient media for furnishing the desired anion or anions to susceptible portions of the plant.

It follows, therefore, that the acids per se and their other forms are equally usable.

The foregoing compounds are highly effective for the intended purpose.

I have discovered that the amount of the respective compounds used to produce a given plant response effect may be markedly reduced, or the plant response effect obtained with a given amount of active ingredient markedly increased, by admixing with any said compound or compounds, one or more of the group consisting of ammonium and substituted ammonium salts of the strong mineral acids, i. e. of sulfuric acid, hydrochloric acid, nitric acid and phosphoric acid, e. g. orthophosphoric acid; said salts being either in neutral or acid form. Particular substituted ammonium salts are the alkylammonium salts, alkanolammonium salts, and mixed alkyl-alkanolammonium salts.

Examples of such salts are ammonium sulfate, chloride, nitrate and phosphate; ammonium acid sulfate; ammonium dihydrogen phosphate and ammonium monohydrogen phosphate; mono-, di-, and trialkylammonium sulfates, chlorides, nitrates and phosphates, having from 1 to 4 carbon atoms in each alkyl radical; mono-, di-, and trialkylammonium acid sulfates and phosphates having from 1 to 4 carbon atoms in each alkyl radical; mono-, di-, and trialkanolammonium sulfates, chlorides, nitrates and phosphates, having from 2 to 3 carbon atoms in each alkanol radical; mono-, di-, and trialkanolammonium acid sulfates and phosphates, having from 2 to 3 carbon atoms in each alkanol radical; mixed alkylalkanolammonium sulfates, chlorides, nitrates and phosphates, which are N-substituted by from 2 to 3 radicals of the type and carbon content indicated; and mixed alkylalkanolammonium acid sulfates and phosphates which are N-substituted by from 2 to 3 radicals of the type and carbon content indicated.

As pointed out above, the sulfates and phosphates contemplated include both the acid sulfates and phosphates and the neutral sulfates and phosphates, and mixed neutral sulfates and phosphates, that is sulfates and phosphates in which the cations are different.

The preparation of the sulfates, chlorides, nitrates and phosphates may be accomplished by any means known to the art, and suitable methods will be found in the literature.

Likewise, the preparation of the active ingredient may be accomplished by any means known to the art, and suitable methods will suggest themselves to persons skilled in chemical synthesis upon becoming familiar with the chemical structure of the active ingredients disclosed herein.

The amount of additive or "intensifier" to be admixed with the active ingredient may vary over a very wide range. A small amount will produce a useful intensifying effect, and since some of the intensifiers employed in this invention are also good fertilizers, especially in the case of ammonium sulfate, ammonium nitrate, and diammonium hydrogen phosphate, I contemplate the use of proportions of intensifier far in excess of those proportions producing optimum intensifying action.

For practicable purposes, proportions of intensifier to active ingredient of from 1:10 to 20:1, and particularly from 1:2 to 5:1 are very useful when the primary purpose of the application of the admixture is the enhancement of phytotoxic effect. On the other hand, when substantial fertilization of soil is also desired, the proportion of intensifier to active ingredient may run quite high, such as up to 100:1, or even more.

The intensifier and the active ingredient may be admixed in any desired manner such as by mere mechanical mixing in solid form, or while in solution in a common solvent such as water. In the latter case the solution may be marketed as such, or if desired, may be dried, such as by spray or drum drying. In any case, it is preferred to have a solid admixture in finely divided form and sufficiently dry to be free flowing.

The admixtures are applied to the crop or plants in any desired manner, such as in the form of a solid, for example, by dusting, or in the form of a liquid, for example, by spraying.

Compositions may be formulated by mixing the admixture containing the intensifier and active ingredient with any desired liquid or solid carriers, such as any of the finely divided solid carriers known in the dusting art, which are preferably of large surface area, such as clay, for example, fuller's earth, pyrophyllite, talc, bentonite, kieselguhr, diatomaceous earth, etc. Any of the commercial clays available on the market in finely divided form may be used, and particularly those which are normally employed as insecticide carriers. Commercial clays, it will be understood, are generally identified by trade names (reflecting the source and mode of processing), of which Homer Clay, Celite, and Tripoli may be mentioned as typical.

Non-clay carriers which may be formulated with my admixture include, for example, sulfur, volcanic ash, calcium carbonate, lime, by-product lignin, lignocellulose, flour, such as wood, walnut shell, wheat, soybean, potato, cottonseed, etc.

Any desired mixture may be prepared by any suitable method. Thus, if a solid, the active ingredient may be ground to a fine powder and tumbled together with the intensifier, or the intensifier and the active ingredient may be ground together; alternately, the active ingredient in liquid form, including solutions, dispersions, emulsions, and suspensions thereof, may be admixed with the intensifier in finely divided form in amounts small enough to preserve the free-flowing property of the final dust composition. Or excess liquid may be removed, such as by vaporization, for example, under reduced pressure. The same applies to mixtures of the active ingredient, the intensifier, and any finely divided solid carrier and/or other material.

When solid compositions are employed, in order to obtain a high degree of plant coverage with minimum poundage per acre, it is desirable that the composition be in finely divided form. Preferably, the dust containing the active ingredient should be sufficiently fine that substantially all will pass through a 50 mesh sieve, and more particularly through a 200 mesh sieve. Excellent results have been obtained in which the dust composition is comprised predominantly of particles in the range from 15 to 45 microns. Finer dusts, such as those consisting largely of particles in the range of 5 microns and below have excellent covering capacity but are somewhat more subject to drift and are more expensive to prepare.

For spray application the admixture may be dissolved or dispersed in a liquid carrier such as water or other suitable liquid.

Aqueous solutions or dispersions are economical and desirable. In general, the choice of the particular liquid carrier employed will be guided somewhat by prevailing circumstances, such as its availability, its solubility or dispersion characteristics toward the particular admixture employed, and/or its toxicity toward the plants undergoing treatment. In general, water is an excellent liquid carrier.

Thus, spray formulations comprising the active ingredient in the form of a solution, suspension, dispersion, or emulsion, in aqueous or non-aqueous media may be employed.

Emulsions or dispersions of the admixture in the liquid carrier may be prepared by agitation of the admixture with the carrier. This is commonly done at the time of spraying. Preferably, however, the agitation should take place in the presence of an emulsifying or dispersing agent (surface active agent), in order to facilitate the preparation of said emulsion or dispersion. Emulsifying and dispersing agents are well known in the art, and include, for example, fatty alcohol sulfates, such as sodium lauryl sulfate, aliphatic or aromatic sulfonates, such as sulfonated castor oil or the various alkaryl sulfonates (such as sodium salt or monosulfonated nonyl naphthalene or tertiary dodecyl benzene), and non-ionic types of emulsifying and dispersing agents such as the high molecular weight alkyl polyglycolethers or analogous thioethers such as the decyl, dodecyl and tetradecyl polyglycolethers and thioethers containing from 25 to 75 carbon atoms.

The use, if desired, of adjuvants, such as wetting agents and/or humectants, is also contemplated in connection with solutions of the admixture, such as water solutions. Any suitable wetting agent and/or humectant may be employed for this purpose, such as the wetting agents more particularly referred to above. Examples of humectants are glycerine, diethylene glycol, ethylene glycol, polyethylene glycols generally, and well known sugar-containing mixtures, such as corn syrup and honey.

For adjuvant purposes, any desired quantity of wetting agent may be empoyed, such as up to 250% or more based on active ingredient. For wetting purposes, the amount of adjuvant used may be considered to be that required to impart the desired wetting qualities to the spray solution as formulated, such as approximately 0.05% by weight of the spray solution. The use of considerably larger amounts is not based upon wetting properties, although present, but is a function of the physiological behavior of the wetting agent after spraying upon the plant.

It should be considered that once the solution has been sprayed upon the plant, the concentration of wetting agent existing upon the plant is in no sense a function of the concentration existing in the original spray solution. Thus, evaporation might concentrate the wetting agent considerably, or the presence of dew on the plant surfaces, or of plant juices on the plant surfaces might considerably dilute this agent.

It will, of course, be understood that wetting agents, particularly when in solid form, may be compounded with the admixture when in solid form.

Although the admixture of active ingredient and intensifier may be applied to the growing plant in concentrated form, it is usually desirable to employ liquid or solid formulations, for example, as discussed above, in which the active ingredient constitutes less than 30% by weight of the total, such as less than 10% and even as low as 0.1%. When it is intended that the intensifier shall also have a substantial effect as a fertilizer, it may, of course, be present in very substantial quantity with or without the presence of a solid or liquid carrier.

Other substances than the carrier and/or surface active agent may be included in solid or liquid formulations if desired. Thus, active ingredients other than those disclosed herein and compatible with the admixture may be added if desired for any particular purpose. Also substances may be added to bring about various physical improvements such as the prevention of lumping during storage, or improvement with respect to coverage, moisture adsorption, adherence, etc. Such other active ingredients may be included in said formulations to accomplish various physiological effects. For example, it may at times be expedient to include singly or in combination, substances such as fungicides, insecticides, bactericides, or types of plant response agents other than those agents discussed herein.

In practice of the process as applied to defoliation, the rate of application (i. e. the amount of admixture per crop unit) for best results will depend among other factors upon the species of plants being treated and upon their maturity. In any event, the amount of active ingredient employed for the same plant response effect will be substantially lower than when the intensifier is not present.

As a rule the more mature the plant at the time of application, the less active material is required. In practice, the crop is normally treated for defoliation purposes, 1 or 2 weeks prior to harvesting. In some instances, more than one application may be desirable, especially if heavy rains or winds should occur soon after the application, or to obtain an accumulative effect. Then too, in order to avoid possible injury to any particular crop, it may be desirable for an inexperienced operator to apply the defoliant initially at a relatively low rate, and to follow with a second application if necessary after observation of the first effects, to obtain the degree of defoliation desired.

Use of dosages greatly in excess of the minimum required for good defoliation may result in shock to the plant with attendant injury to the remainder of the plant.

In fact, the plant response agent of the present invention is an effective herbicide when used in amounts substantially greater than those required for defoliation, and it may be used advantageously for the killing of plants or vines (as in the case of potatoes), when desired, such as, for the killing of undesired plants, for example, weeds or grasses, or for the killing of crops, irrespective of whether such undesired plants or crops are of species which lend themselves to defoliation.

Thus when defoliation is the objective the quantity applied should be sufficient to cause at least the major portion of the leaves to dry up and/or to drop from the living plant, but insufficient to cause substantial herbicidal action on the plant. On the other hand, when plant killing is the objective, any amount sufficient for this purpose may be applied. In the latter connection, since different species of plants vary markedly in their relative resistance to herbicidal action, selective killing of plant species may be practiced. Such selectivity may be varied by compounding, such as with adjuvants, for example, wetting agents, in addition to the use of an intensifier.

I am aware of the fact that it has been proposed to use certain ammonium salts, such as ammonium sulfate, in combination with phenolic substances, such as dinitroalkylphenols and pentachlorophenol, for plant response purposes. The purpose of such use of ammonium salts as explained by Crafts and Reiber, Hilgardia, volume 16, pages 487–499, and by Crafts, Science, volume 108, pages 85–86, is to make available the free phenol at the plant surface from an aqueous solution of a water-soluble salt of said phenol. The phenol in such cases is the active plant response substance and is continuously regenerated at the plant surface from its water-soluble salt by virtue of the presence of the ammonium salt. As the free phenol is absorbed by the plant surface, further free phenol is generated under equilibrium conditions. The plant response effect of the free phenol is not enhanced or intensified by such procedure, or in other words, is substantially the same as that obtained by the application directly to the plant of a similar quantity of free phenol. In view of the insolubility of the phenol in water, this procedure is adopted in order to make available the use of water as a vehicle for applying the plant response agent, i. e. herbicide, to the plant surfaces.

In the case of my invention, on the other hand, the plant response effect obtained from a given quantity of active ingredient is greater than that obtained by the application of the same quantity of the particular active ingredient to the plant in the absence of my intensifier. In fact, the plant response effect obtained with the same quantiy of active ingredient may be increased many times by the addition of larger quantities of my intensifier. The intensification begins to manifest itself by the addition of a small proportion of my intensifier and increases to a point of optimum intensification by the addition of increasing proportions of intensifier. For optimum plant response effects, the proportion of intensifier to active ingredient may vary somewhat between specific active ingredients and between specific varieties of plants undergoing treatment, so that the exact proportion for optimum effect under all conditions cannot be given. However, the intensification of the plant response effect is present when a small quantity of intensifier is added, and the addition of intensifier beyond the point at which no further marked increase in intensification is obtained does no harm, and may have a very useful purpose, such as when the intensifier is also a fertilizer.

The exact mechanism by which the intensification of the active ingredient is obtained in the practice of my invention is not known. However, such intensification is cogently demonstrated by the following examples which are by way of illustration and not of limitation.

*Example 1*

A stock solution was prepared by dissolving 3,6 - endoxohexahydro - orthophthalic acid in water; the amount of acid used was that required to give a 0.0005 molar solution. The pH of this solution was 4.7.

Aqueous 0.5 N sodium hydroxide was added to five portions of the stock solution to give a series of solutions having pH values as follows: 5.4, 6.5, 7.7, 8.4, and 10.0, none being added to one portion, the pH of which remained at 4.7.

Each solution in this series (6 in number) was divided into two parts to make two groups. Nothing further was added to one group.

To the members of the second group was added enough ammonium sulfate to give a concentration of 0.1% in all cases. Thus the proportion of original acid to ammonium sulfate was 1 to 10.7. The members of the second group had pH values as follows: 4.6, 5.5, 6.6, 6.8, 7.7, and 8.1.

Separate groups of eight potted Dwarf Horticultural bean plants at the stage at which the first trifoliate leaf was still furled were dipped to the first nodes into the respective test solutions of each group, and the excess solution was shaken off.

Observations made five days later were as follows.

With the group of solutions of varying pH having no ammonium sulfate added, the effects upon the respective groups of plants were substantially similar, namely, poor defoliation and slight retardation of the trifoliate shoots. It will be noted that the concentration of active ingredient was extremely low.

With the group of solutions of varying pH having ammonium sulfate added, the effects upon the respective groups of plants were again substantially similar, namely, excellent defoliation and severe retardation of the trifoliate shoots. Thus it will be noted that the ammonium sulfate markedly intensified the physiological activity of the active ingredient.

Untreated plants and plants treated with a 0.1% ammonium sulfate solution, grown and kept throughout the experiment under the same greenhouse conditions, were entirely unaffected.

*Example 2*

Two series of aqueous solutions of disodium 3,6-endoxohexahydro-orthophthalate were prepared, one without and one with 0.1% ammonium sulfate, respectively, at the following molar concentrations of active ingredient: 0.000025, 0.00005, 0.0001, 0.00025, and 0.0005.

Separate groups of eight potted Dwarf Horticultural bean plants at the stage at which the first trifoliate leaf was still furled were dipped to the first nodes into the respective test solutions of each series, and the excess solution was shaken off.

Observations made six days later were as follows:

| Conc. of active ingredient | Physiological effects | |
|---|---|---|
| | Without $(NH_4)_2SO_4$ | With 0.1% $(NH_4)_2SO_4$ |
| 0.000025 M | No effect | Light to moderately burned. |
| .00005 | do | 1B, 1S; adhering PL considerably burned. |
| .0001 | Light burn | 5B, 1S; adhering PL shrivelled. |
| .00025 | 2S; adhering PL moderately burned. | 6B; TS severely retarded. |
| .0005 | 5B, 1S; adhering PL considerably burned. | 2B, 1S; adhering PL shrivelled and "frozen." |

In the above table, 2S, for example, means each of two plants had a single primary leaf abscised; 5B, for example, means each of five plants had both primary leaves abscised. PL means primary leaves; TS means trifoliate shoots. The same code applies wherever applicable in the following examples.

*Example 3*

Two series of aqueous solutions of disodium 3,6-endoxohexahydro-orthophthalate were prepared, one without and one with 0.025% of ammonium acid sulfate, respectively, at the following concentrations of active ingredient: 0.0005%, 0.001%, 0.0025%, 0.005%, and 0.01%.

For testing purposes, the procedure of Example 2 was followed with the same variety of bean plants.

Observations made nine days later were as follows:

| Conc. of active ingredient | Physiological effects | |
|---|---|---|
| | Without $NH_4HSO_4$ | With 0.025% $NH_4HSO_4$ |
| 0.0005% | No effect | No effect. |
| .001% | do | Do. |
| .0025% | Light burn | 4B, 2S; considerable PL burn. |
| .005% | 2B, 1S | 7B; one plant, leaves severely burned. |
| .01% | 8B | 7B; one plant, leaves withered and "frozen." |

*Example 4*

Two series of aqueous solutions of sodium acid 3,6-endoxohexahydro-orthophthalate were prepared, one without and one with 0.1% ammonium sulfate, respectively, at the following molar concentrations of active ingredient: 0.00001, 0.000025, 0.00005, 0.0001, 0.00025, and 0.0005.

For testing purposes, the procedure of Example 2 was followed with the same variety of bean plants.

Observations made six days later were as follows:

| Conc. of active ingredient | Physiological effects | |
|---|---|---|
| | Without $(NH_4)_2SO_4$ | With 0.1% $(NH_4)_2SO_4$ |
| 0.00001 M | No effect | No effect. |
| .000025 | do | Do. |
| .00005 | do | Do. |
| .0001 | Slight burn; TS as controls. | Moderate burn; TS as controls. |
| .00025 | Moderate burn; TS as controls. | 4B; adhering PL severely burned; TS severely retarded. |
| .0005 | 1S; adhering PL considerably burned; TS as controls. | 8B; TS severely retarded. |

*Example 5*

Two series of aqueous solutions of diammonium 3,6-endoxohexahydro-orthophthalate were prepared, one without and one with 0.1% ammonium sulfate, respectively, at the following molar concentrations of active ingredient: 0.00001, 0.000025, 0.00005, 0.0001, 0.00025, and 0.0005.

For testing purposes, the procedure of Example 2 was followed with the same variety of bean plants.

Observations made six days later were as follows:

| Conc. of active ingredient | Physiological effects | |
|---|---|---|
| | Without $(NH_4)_2SO_4$ | With 0.1% $(NH_4)_2SO_4$ |
| 0.00001 M | No effect | No effect. |
| .000025 | do | Do. |
| .00005 | Slight burn; TS as controls. | Considerable burn; TS as controls. |
| .0001 | do | 4B; considerable burn; TS severely retarded. |
| .00025 | 1S; TS very slightly retarded. | 7B, 1S; adhering PL severely burned; TS severely retarded. |
| .0005 | 2B, 1S; adhering PL severely burned; TS considerably retarded. | 8B; 2 plants TS destroyed; 6 plants TS severely retarded. |

*Example 6*

Two series of aqueous solutions of ammonium acid 3,6-endoxohexahydro-orthophthalate were prepared, one without and one with 0.1% ammonium sulfate, respectively, at the following molar concentrations of active ingredient: 0.00001, 0.000025, 0.00005, 0.0001, 0.00025, and 0.0005.

For testing purposes, the procedure of Example 2 was followed with the same variety of bean plants.

Observations made six days later were as follows:

| Conc. of active ingredient | Physiological effects | |
|---|---|---|
| | Without $(NH_4)_2SO_4$ | With 0.1% $(NH_4)_2SO_4$ |
| 0.00001 M | No effect | No effect. |
| .000025 | do | Do. |
| .00005 | do | Considerably burned; TS as controls. |
| .0001 | Slight burn; TS as controls. | 4B; TS considerably retarded. |
| .00025 | 1S; TS very slightly retarded. | 7B, 1S; TS severely retarded. |
| .0005 | 5B, 3S; adhering PL severely burned; TS severely retarded. | 8B; 2 plants TS destroyed; 6 plants TS severely retarded. |

*Example 7*

Two series of aqueous solutions of disodium 3,6-endoxohexahydro-orthophthalate were prepared, one without and one with 0.1% ammonium nitrate, respectively, at the following molar concentrations of active ingredient: 0.000025, 0.00005, 0.0001, 0.00025, and 0.0005.

For testing purposes, the procedure of Example 2 was followed with the same variety of bean plants.

Observations made four days later were as follows:

| Conc. of active ingredient | Physiological effects | |
|---|---|---|
| | Without $NH_4NO_3$ | With 0.1% $NH_4NO_3$ |
| 0.000025 M | No effect | No effect. |
| .00005 | do | Light burn. |
| .0001 | Slight burn | Moderate burn. |
| .00025 | 1S; adhering PL moderately burned; TS slightly retarded. | 2B; adhering PL considerably burned; TS severely retarded. |
| .0005 | 2S; adhering PL moderately burned; TS moderately retarded. | 4B; adhering PL considerably burned; TS severely retarded. |

Example 8

Two series of aqueous solutions of disodium 3,6-endoxohexahydro-orthophthalate were prepared, one without and one with 0.1% ammonium chloride, respectively, at the following concentrations of active ingredient: 0.0005%, 0.001%, 0.0025%, 0.005%, and 0.01%.

For testing purposes, the procedure of Example 2 was followed with the same variety of bean plants.

Observations made five days later were as follows:

| Conc. of active ingredient | Physiological effects | |
|---|---|---|
| | Without NH₄Cl | With 0.1% NH₄Cl |
| 0.0005% | No effect | No effect. |
| .001% | do | Do. |
| .0025% | Burned spots | Moderately burned. |
| .005% | Somewhat burned | 1S; adhering PL considerably burned. |
| .01% | Moderately burned; TS as controls. | 1S; adhering PL considerably burned; TS slightly retarded. |

Example 9

Two series of aqueous solutions of disodium 3,6-endoxohexahydro-orthophthalate were prepared, one without and one with 0.1% of diammonium hydrogen phosphate, respectively, at the following concentrations of active ingredient: 0.0005%, 0.001%, 0.0025%, 0.005%, and 0.01%.

For testing purposes, the procedure of Example 2 was followed with the same variety of bean plants.

Observations made five days later were as follows:

| Conc. of active ingredient | Physiological effects | |
|---|---|---|
| | Without $(NH_4)_2HPO_4$ | With 0.1% $(NH_4)_2HPO_4$ |
| 0.0005% | No effect | No effect. |
| .001% | do | Do. |
| .0025% | Burned spots | Burned areas. |
| .005% | Somewhat burned; TS as controls. | 1B; adhering PL moderately burned; TS slightly retarded. |
| .01% | Moderately burned; TS as controls. | 2S; adhering PL considerably burned; TS slightly retarded. |

Example 10

A small hypodermic syringe was used to apply to the hypocotyls of young Dwarf Horticultural bean plants very tiny droplets (about 75 droplets per plant, the total volume being 0.05 ml.) of aqueous solutions of disodium 3,6-endoxohexahydro-orthophthalate of the following respective concentrations: 0.01%, 0.02%, 0.05%, and 0.1%. Application of these solutions to the hypocotyls was quite uniform. The bean plants were at the stage at which the first trifoliate leaves were still furled.

Each respective test solution was applied in the above manner to a group of five plants.

Similar experiments were performed in which the test solutions contained the above-named concentrations of disodium 3,6-endoxohexahydro-orthophthalate, and in addition contained 0.1% of ammonium sulfate.

Observations made eight days later were as follows:

| Active ingredient | | Physiological effects | |
|---|---|---|---|
| Conc. | Amt. per plant | Without $(NH_4)_2SO_4$ | With 0.1% $(NH_4)_2SO_4$ |
| Per cent | Micrograms | | |
| 0.01 | 5 | Slight burn on H | 2S; 1 plant TS severely retarded, four plants burned on H. |
| .02 | 10 | Slight burn on H | One plant B and TS severely retarded; two plants burned on H; two plants killed. |
| .05 | 25 | Moderate burn on H. | Four plants burned on H; one plant killed. |
| .1 | 50 | Burned area on two PL, one plant; severe burned on H; TS as controls. | On two plants, 2S and adhering PL considerably burned, and TS severely retarded; 3 plants killed. |

H stands for hypocotyl.

Example 11

Aqueous solutions of disodium 3,6-endoxohexahydro-orthophthalate of the following respective concentrations were spray-misted by means of a small DeVilbiss atomizer onto individual groups of twenty potted young Dwarf Horticultural bean plants: 0.25%, 0.5%, 1.0%, and 2.0%. The plants were at a stage of growth at which several trifoliate leaves had developed and blossoms were beginning to appear.

Each group of twenty plants was arranged uniformly in a 2 foot by 3 foot area, and 3 ml. of test solution was uniformly sprayed in the described manner onto the area. This rate of application corresponds to 6 gallons per acre; this low volume rate simulates practical conditions of aeroplane spraying. Thus the amount of active ingredient was 0.125, 0.25, 0.5, and 1.0 pound, respectively, per acre.

A parallel series of tests was carried out in which the aqueous solutions of the above concentrations of the active ingredient also contained 1.25%, 2.5%, 5.0%, and 10.0% of ammonium sulfate, respectively. Thus the amount of ammonium sulfate was 0.625, 1.25, 2.5, and 5 pounds, respectively, per acre. In all cases, the ratio of intensifier to active ingredient was 5:1.

Observations made ten days later were as follows:

| Conc. of active ingredient, lbs. per acre | Without $(NH_4)_2SO_4$ | | | With $(NH_4)_2SO_4$ | | |
|---|---|---|---|---|---|---|
| | Per Cent Defoliation | | Stem injury | Per Cent Defoliation | | Stem injury |
| | PL | TL | | PL | TL | |
| 0.125 | 0 | 0 | None | 25 | 35 | None. |
| .25 | 10 | 15 | do | 95 | 95 | Do. |
| .5 | 35 | 60 | do | 98 | 98 | Light. |
| 1.0 | 70 | 85 | do | 98 | 99 | Moderate. |

PL means primary leaves; TL means trifoliate leaves.

When ammonium sulfate alone was applied to bean plants by the above procedure at a dosage of 5 pounds per acre, the plants were unaffected.

Example 12

Individual plots, each 2 feet by 5 feet, were sprayed with aqueous solutions of disodium 3,6-endoxohexahydro-orthophthalate at the following respective concentrations; 0.25%, 0.5%, and 1.0%. The plots were infested with but one species of pestiferous weed, namely, spurge. Each plot received 87 ml. of the spray solution;

this rate of application corresponds to 100 gallons per acre. The respective dosages of active ingredient were 2.0, 4.0, and 8.0 pounds per acre.

A parallel series of tests was carried out in which the aqueous solutions of the above concentrations of active ingredient also contained 1.25%, 2.5%, and 5.0% of ammonium sulfate, respectively. Thus, in all cases the ratio of intensifier to active ingredient was 5:1.

All solutions of the active ingredient (those with and without ammonium sulfate) contained 0.05% of a high molecular weight alkyl polyglycolthioether wetting agent.

Observations made at intervals were as follows:

It was found that a 5.0% solution of ammonium sulfate alone applied at the rate of 50 gallons per acre (i. e., 20 pounds ammonium sulfate per acre) did not affect the chickweed after 7 days.

The active ingredients are capable of existing in three separate and distinct geometrically isomeric forms, namely, the exo-cis isomer, the endo-cis isomer, and the trans isomer, as defined in the case of hexahydro compounds by Woodward and Baer, Journal of the American Chemical Society, 70, 1161–1166. Of these three isomers the exo-cis isomer is preferred in view of its generally greater activity. Furthermore, the exo-cis isomer can be prepared more economical-

| Time after treatment | Without $(NH_4)_2SO_4$ | | | With $(NH_4)_2SO_4$ | | |
|---|---|---|---|---|---|---|
| | Pounds active ingredient per acre | | | | | |
| | | | | 2 | 4 | 8 |
| | 2 | 4 | 8 | Pounds $(NH_4)_2SO_4$ per acre | | |
| | | | | 10 | 20 | 40 |
| 2 days | Somewhat yellowed. | Somewhat yellowed. | Considerably yellowed. | Considerably yellowed. | Considerably yellowed. | Heavily burned. |
| 3 days | Considerably yellowed. | Considerably yellowed. | Severe yellowing. | Severe yellowing. | 25% of plants dead or dying, 75% heavily burned. | All plants dead or dying. |
| 5 days | 15% of plants dying, 85% considerably yellowed. | 35% of plants dying, 65% considerably yellowed. | 85% of plants dying, 15% severe yellowing. | 85% of plants dying, 15% severe yellowing. | 90% of plants dying, 10% severe yellowing. | 100% dead. |

It was found that a 5% solution of ammonium sulfate alone applied at the rate of 100 gallons per acre (i. e., 40 pounds ammonium sulfate per acre) did not affect the spurge after five days.

*Example 13*

Individual plots, each 10 square feet in area, were sprayed with aqueous solutions of disodium 3,6-endoxohexahydro-orthophthalate at the following respective concentrations: 0.25%, 0.5%, and 1.0%. The plots were laid out in a lawn badly infested with chickweed. The weeds at the time of treatment averaged about 6 inches and were flowering. Each plot received 43.5 ml. of the spray solution; this rate of application corresponds to 50 gallons per acre. The respective dosages of active ingredient were 1.0, 2.0, and 4.0 pounds per acre.

A parallel series of tests was carried out in which the aqueous solutions of the above concentrations of active ingredient also contained 1.25%, 2.5%, and 5.0% of ammonium sulfate, respectively. The ratio of intensifier to active ingredient was 5:1 in all instances.

Observations were made seven days later, as follows:

ly and conveniently. The active ingredient in the foregoing examples was of the exo-cis isomeric form.

When the active ingredients are used in the form of the acids per se and/or their anhydrides, aqueous solutions containing such acids and/or anhydrides probably contain non-ionized acid and/or anhydride in equilibrium with ionized material. Similar considerations might apply to some of the salts.

The alkylammonium salts of 3,6-endoxohydro-orthophthalic acids, such as monoalkylammonium, dialkylammonium, or trialkylammonium salts preferably have from 1 to 12 carbon atoms in each alkyl radical, the totality of carbon atoms preferably being not more than 12. The alkanolammonium salts such as monoalkanolammonium, dialkanolammonium, or trialkanolammonium preferably have from 2 to 3 carbon atoms in each alkanol radical. The mixed alkylalkanolammonium salts such as monoalkyl monoalkanolammonium, dialkyl monoalkanolammonium, or monoalkyl dialkanolammonium preferably have from 1 to 4 carbon atoms in each alkyl radical and from 2 to 3 carbon atoms in each alkanol radical.

The alkylammonium salts (neutral salts, and

PHYSIOLOGICAL EFFECTS 7 DAYS AFTER TREATMENT

| Without $(NH_4)_2SO_4$ | | | With $(NH_4)_2SO_4$ | | |
|---|---|---|---|---|---|
| Pounds active ingredient per acre | | | | | |
| | | | 1 | 2 | 4 |
| 1 | 2 | 4 | Pounds $(NH_4)_2SO_4$ per acre | | |
| | | | 5 | 10 | 20 |
| Moderately burned. | Considerably burned. | Approx. 10% of plants killed, 90% heavily burned. | Approx. 10% of plants killed, 90% heavily burned. | Approx. 15% of plants killed, 85% heavily burned. | Approx. 25% of plants killed, 75% very heavily burned. | also acid salts in cases where such exist) of the strong mineral acids mentioned herein, such as monoalkylammonium, dialkylammonium, or trialkylammonium salts, preferably have from 1 to 4 carbon atoms in each alkyl radical. The alkanolammonium salts such as monoalkanolammonium, dialkanolammonium, or trialkanolammonium preferably have from 2 to 3 carbon atoms in each alkanol radical. The mixed alkylalkanolammonium salts such as monoalkyl monoalkanolammonium, dialkyl monoalkanolammonium, or monoalkyl dialkanolammonium preferably have from 1 to 4 carbon atoms in each alkyl radical and from 2 to 3 carbon atoms in each alkanol radical.

The following examples apply to both the active ingredient and the intensifier.

Examples of monoalkylammonium salts are the monomethylammonium, monoethylammonium, monopropylammonium, monobutylammonium, monoamylammonium, monohexylammonium monoheptylammonium, mono - octylammonium, monononylammonium, monodecylammonium, monoundecylammonium, monododecylammonium and similar monoalkylammonium salts of such acids.

Examples of dialkylammonium salts are the dimethylammonium, diethylammonium, dipropylammonium, dibutylammonium, diamylammonium, dihexylammonium, methylethylammonium, ethylpropylammonium, propylbutylammonium, butylamylammonium, amylhexylammonium, methylundecylammonium, and similar dialkylammonium salts of such acids.

Examples of trialkylammonium salts are the trimethylammonium, triethylammonium, tripropylammonium, tributylammonium, methyldiethylammonium, ethyldipropylammonium, propyldibutylammonium, methyldiamylammonium, ethyldiamylammonium, methylethylpropylammonium, ethylpropylbutylammonium, and similar salts of such acids.

Examples of monoalkanolammonium salts are the monoethanolammonium, monopropanolammonium, and similar salts of such acids.

Examples of dialkanolammonium salts are the diethanolammonium, dipropanolammonium, ethanolpropanolammonium and similar salts of such acids.

Examples of trialkanolammonium salts are the triethanolammonium, tripropanolammonium, ethanoldipropanolammonium, propanoldiethanolammonium and similar salts of such acids.

Examples of monoalkyl monoalkanolammonium salts are the methylethanolammonium, ethylethanolammonium, propylethanolammonium, butylethanolammonium, methylpropanolammonium, ethylpropanolammonium, propylpropanolammonium, butylpropanolammonium, and similar salts of such acids.

Examples of dialkyl monoalkanolammonium salts are the dimethylethanolammonium, diethylethanolammonium, dipropylethanolammonium, dibutylethanolammonium, dimethylpropanolammonium, diethylpropanolammonium, dipropylpropanolammonium, dibutylpropanolammonium, methylethylethanolammonium, methylethylpropanolammonium, ethylpropylethanolammonium, ethylpropylpropanolammonium, propylbutylethanolammonium, propylbutylpropanolammonium, and similar salts of such acids.

Examples of monoalkyl dialkanolammonium salts are the methyldiethanolammonium, ethyldiethanolammonium, propyldiethanolammonium, butyldiethanolammonium, methyldipropanolammonium, ethyldipropanolammonium, propyldipropanolammonium, butyldipropanolammonium, methylethanolpropanolammonium, ethylethanolpropanolammonium, propylethanolpropanolammonium, butylethanolpropanolammonium, and similar salts of such acids.

As pointed out above the salts contemplated include both the acid salts and the neutral salts, and mixed neutral salts, that is salts in which the cations are different.

The term plant as used herein is understood to include all portions of the plant, such as the roots, stems, leaves, blossoms, seeds, and fruit.

Among the plants which defoliate naturally and which may be defoliated by the use of this invention are for example, cotton, potatoes, tomatoes, and beans such as soy beans and lima beans.

Among the noxious weeds against which my compositions evidence outstanding herbicidal properties are the following: bindweed, chickweed, cocklebur, mare's tail, shepherd's-purse, broad-leaved plantain, wild lettuce, ragweed, spurge, dock, and wild carrot.

As pointed out above, certain of the intensifiers referred to herein are well-known soil fertilizers, such as ammonium sulfate, ammonium nitrate, and diammonium hydrogen phosphate. It follows that the active ingredient in an amount sufficient to cause the desired plant response action may be compounded with such fertilizer and applied simultaneously therewith. This is praticularly applicable to pre-emergence or pre-planting practices for the control of weeds, to post-emergence treatment for fertilizing purposes and control of weeds as to such useful crops to which the active ingredient evidences only slight or no herbicidal action, such for example as onions, sugar beets, flax, carrots, and cole crops, and otherwise following agricultural practices. The proportion of intensifier to active ingredient in such cases may be as desired, dependent largely upon the amount of fertilizer to be applied per acre, so as to obtain the desired coverage of active ingredient in admixture with the fertilizer. For example, the proportion of intensifier to active ingredient may range from 1000:1 or 500:1 to 100:1 or 200:1.

From the foregoing it can be seen that the active ingredients used in the practice of this invention, whether used as the acid or in some other form, are highly effective in regulating the growth characteristics of viable or living plants, and particularly of plants having vascular systems, when used in admixture with my intensifier. For example, the admixture may be employed to hasten defoliation of plants which defoliate naturally, or may be employed to terminate the life cycle of plants, or may be employed to retard the growing of seeds, or may be employed to selectively stunt or terminate the growth of certain unwanted plants to facilitate and favor the growth of wanted plants, or may be employed to terminate the growth of vines in favor of, or to facilitate harvesting of, the fruits of such vines, or may be employed to stimulate root growth on cuttings, etc. Other applications of the invention in the regulation of the growth characteristics of plants will occur to persons skilled in the art upon becoming familiar herewith.

Accordingly, it is to be understood that the particular description is by way of illustration and that the patent is intended to cover by suitable expression in the claims whatever features of novelty reside in the invention.

I claim:
1. A plant response composition comprising a salt of a strong mineral acid with at least one of the group consisting of ammonia, alkyl amines, alkanol amines, and mixed alkylalkanol amines; and a compound which when in the presence of water yields anions having the configuration

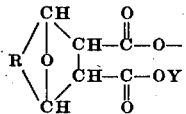

in which Y represents one of the group consisting of an unsatisfied valence and a cation, and in which R represents one of the group consisting of the vinylene radical and the ethylene radical.

2. A plant response composition comprising a water-soluble compound containing an anion of 3,6-endoxohexahydro-orthophthalic acid, and a salt of a strong mineral acid with at least one of the group consisting of ammonia, alkyl amines, alkanol amines, and mixed alkylalkanol amines.

3. The composition of claim 2 in which said anion is in the exo-cis isomeric form.

4. The composition of claim 3 in which said salt is an ammonium sulfate.

5. The composition of claim 4 in which said salt is ammonium sulfate.

6. The composition of claim 5 containing a wetting agent.

7. A plant response composition comprising a water-soluble compound containing an anion of 3,6-endoxo-1,2,3,6-tetrahydro-orthophthalic acid, and a salt of a strong mineral acid with at least one of the group consisting of ammonia, alkyl amines, alkanol amines, and mixed alkylalkanol amines.

8. The composition of claim 7 in which said anion is in the exo-cis isomeric form.

9. The composition of claim 8 in which said salt is an ammonium sulfate.

10. The composition of claim 9 in which said salt is ammonium sulfate.

11. The composition of claim 10 containing a wetting agent.

12. A method for regulating the growth characteristics of a plant, comprising applying to said plant a plant response composition comprising a salt of a strong mineral acid with at least one of the group consisting of ammonia, alkyl amines, alkanol amines, and mixed alkylalkanol amines; and a compound which when in the presence of water yields anions having the configuration

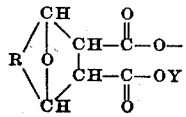

in which Y represents one of the group consisting of an unsatisfied valence and a cation, and in which R represents one of the group consisting of the vinylene radical and the ethylene radical.

13. A method for inducing plant response in a living plant, comprising applying to said plant a composition comprising a water-soluble compound containing an anion of 3,6-endoxohexahydro-orthophthalic acid, and a salt of a strong mineral acid with at least one of the group consisting of ammonia, alkyl amines, alkanol amines, and mixed alkylalkanol amines.

14. The method of claim 13 in which said anion is in the exo-cis isomeric form.

15. A method for inducing plant response in a living plant, comprising applying to said plant a composition comprising a water-soluble compound containing an anion of 3,6-endoxo-1,2,3,6-tetrahydro-orthophthalic acid, and a salt of a strong mineral acid with at least one of the group consisting of ammonia, alkyl amines, alkanol amines, and mixed alkylalkanol amines.

16. The method of claim 15 in which said anion is in the exo-cis isomeric form.

17. A plant response and soil treating composition comprising a major proportion of a soil fertilizing ammonium salt of a strong mineral acid, and a minor but sufficient proportion for plant response effect of a water-soluble salt containing an anion of 3,6-endoxohexahydro-orthophthalic acid.

18. The composition of claim 17 in which said anion is in the exo-cis isomeric form.

19. A plant response and soil treating composition comprising a major proportion of a soil fertilizing ammonium salt of a strong mineral acid, and a minor but sufficient proportion for plant response effect of a compound which when in the presence of water yields anions having the configuration

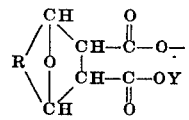

in which Y represents one of the group consisting of an unsatisfied valence and a cation, and in which R represents one of the group consisting of the vinylene radical and the ethylene radical.

NATHANIEL TISCHLER.

No references cited.